United States Patent [19]

Takeda

[11] Patent Number: 5,142,428
[45] Date of Patent: Aug. 25, 1992

[54] WATER SENSING TYPE POWER BREAKER CIRCUIT

[75] Inventor: Hideaki Takeda, Misato, Japan

[73] Assignee: Uchiya Thermostat Co., Ma-Ken, Japan

[21] Appl. No.: 572,087

[22] Filed: Aug. 23, 1990

[30] Foreign Application Priority Data

Sep. 5, 1989 [JP] Japan .................................... 229587
Nov. 17, 1989 [JP] Japan .................................... 298817

[51] Int. Cl.$^5$ .............................................. H02H 3/16
[52] U.S. Cl. ........................................ 361/42; 361/91; 361/178
[58] Field of Search ..................... 361/42, 91, 119; 307/118

[56] References Cited

U.S. PATENT DOCUMENTS 4,464,582  8/1984  Aragaki et al. ................. 361/42
4,791,519  12/1988  Madsen ........................... 361/42

FOREIGN PATENT DOCUMENTS 3621528  1/1988  Fed. Rep. of Germany .
3800291  7/1989  Fed. Rep. of Germany .
8701902  4/1987  World Int. Prop. O. .

*Primary Examiner*—Howard L. Williams
*Assistant Examiner*—S. Jackson
*Attorney, Agent, or Firm*—Stanger, Michaelson, Spivak & Wallace

[57] ABSTRACT

A water sensing type power breaker circuit is incorporated into an electric appliance such as a hair dryer or the like and is used to cut off a power supply to prevent an accident due to an electric shock immediately when the electric appliance is dropped into the water.

A water sensing type power breaker circuit includes first and second contacts having one polarity connected to a power supply and the other polarity connected to a load, an impedance element circuit including first and second impedance elements connected in series each other and which is connected in parallel with the load, a water sensing element made of an electrical conductor connected to an intermediate point between both the impedance elements through a conductor, and a relay for detecting a current flowing through the conductor to open the first and second contacts when the current flows through the conductor. The relay is held by itself so that the first and second contacts are opened. The water sensing type power breaker circuit is inexpensive and has a small occupancy volume so that it can be directly incorporated into the electric appliance such as a dryer.

14 Claims, 4 Drawing Sheets

WATER SENSING TYPE POWER BREAKER CIRCUIT

FIELD OF THE INVENTION AND RELATED ART STATEMENT

The present invention relates to a water sensing type power breaker circuit. The water sensing type power breaker circuit is incorporated into an electric appliance such as a hair dryer or the like and is used to cut off a power supply to prevent an accident due to an electric shock immediately when the electric appliance is dropped into the water.

FIG. 8 is a circuit diagram of an example of a conventional water sensing type power breaker circuit.

One output terminal of a transformer is connected to ground. Accordingly, when an electric appliance is dropped into the water electrically connected to ground, a leakage current is flows in the water.

A total current $i_1 + i_2$ of currents $i_1$ and $i_2$ flowing through conductors $L_1$ and $L_2$, respectively, connecting the transformer TF and a load circuit LOAD Is detected by a coil COIL of a relay ZRL. Since the flowing directions of the currents $i_1$ and $i_2$ are opposite to each other, $i_1 + i_2 = 0$ in the case of $i_s = 0$. However, when the electric appliance is dropped into the water and the leakage current $i_s$ is 0, $i_1 + i_2 \neq 0$. At this time, the relay ZRL is operated to open contacts $A_1$ and $A_2$ so that a power supply is cut off.

OBJECT AND SUMMARY OF THE INVENTION

There is a problem that the conventional water sensing type power breaker circuit is expensive and requires large space.

It is an object of the present invention to provide a water sensing type power breaker circuit which is cheap and has small space to be directly incorporated into an electric appliance such as a dryer.

In order to achieve the above object, the water sensing type power breaker circuit according to the present invention comprises first and second contacts having one polarity connected to a power supply and the other polarity connected to a load, an impedance element circuit including first and second impedance elements connected in series with each other and which is connected in parallel with the load, a water sensing element made of an electrical conductor connected to an intermediate point between both the impedance elements through a conductor, and a relay for detecting a current flowing through the conductor to open the first and second contacts when the current flows through the conductor, the relay being held by itself so that the first and second contacts are opened, the first impedance element being a resistor and the second impedance element being a condenser.

According to another aspect of the invention, instead of the first impedance element being a resistor and the second impedance element being a condenser, the first and second impedance elements are both condensers.

According to yet another aspect of the invention, instead of the first impedance element being a resistor and the second impedance element being a condenser, the first and second impedance elements are both resistors.

According to yet another aspect of the invention, a diode emits light when current flows through the water sensing element, a photo-diode converts a light signal of the light emitting diode into an electrical signal, an amplifier amplifies an output at the photo diode, and an output of the amplifier supplies the relay coil.

FIG. 9 is a basic circuit diagram of water sensing type power breaker circuit according to the present invention.

Conductors A and B connecting a power supply to a load L is cut off by means of first and second contacts $P_1$ and $P_2$. The contacts $P_1$ and $P_2$ are on, that is, close in the normal state. An impedance element circuit including first and second impedance elements $Z_1$ and $Z_2$ connected each other is connected in parallel with the load LOAD. A current flowing through a conductor F connecting an intermediate point between both the impedance elements $Z_1$ and $Z_2$ to a water sensing element S is detected by a relay RL. When an electric appliance is dropped into the water, a current flows between the water sensing element S and the conductor A or B. Further, when one terminal of the power supply is connected to ground, a current flows between the water sensing element S and the ground G. This current is detected by the relay RL so that the contacts $P_1$ and $P_2$ are opened. As a result, the power supply is cut off.

Since a value of the current flowing through the water sensing element is limited by the impedance of the impedance element, a value of a leakage current (which flows instantaneously when the electric appliance is dropped into the water) can be minimized.

The present invention is advantageous in that:

i) When the capacity of both of condensers constituting the impedance elements is equal to, for example, about 0.2 $\mu$F, the leakage current is about 2 to 5 mA and the load is cut off from the power supply by this leakage current.

ii) Since the water sensing element is the merest electrical conductor, its occupancy volume is small and it can be mounted on any location of the electric appliance freely. Even in a small electric appliance such as, for example, a hair dryer, the electrical conductor is simply disposed in an air intake or an air outlet constituting a water entering opening to form the water sensing element.

iii) Since any special electrical element is not required, the water sensing element can be made inexpensively and can be attached to a cheap electric appliance such as a hair dryer.

DETAILED DESCRIPTION OF PREFERRED EMBODIMENTS

Figure 1:
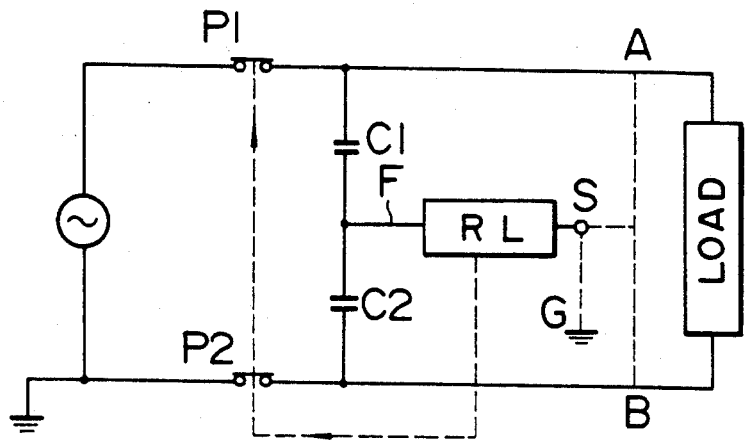
FIGS. 1 to 7 are circuit diagrams of embodiments according to the present invention in the case where impedance elements are condensers.
Figure 9:
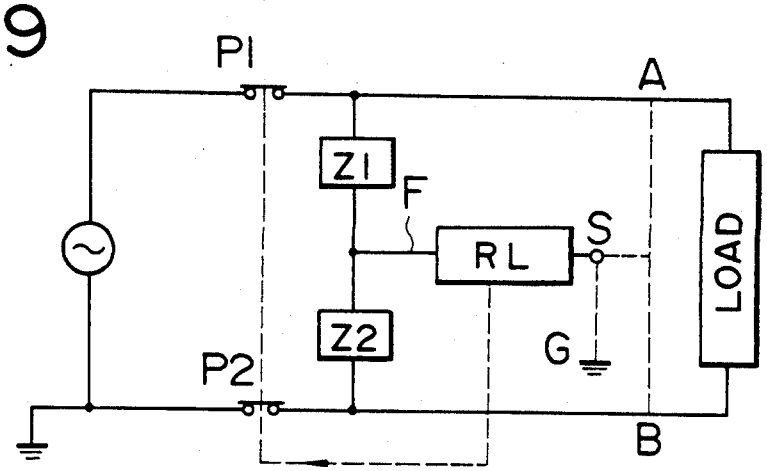
FIG. 9 is a circuit diagram showing a principle of the present invention.

FIG. 1 is a circuit diagram in the case where the first and second impedance elements $Z_1$ and $Z_2$ in FIG. 9 are first and second condensers $C_1$ and $C_2$.

Figure 2:
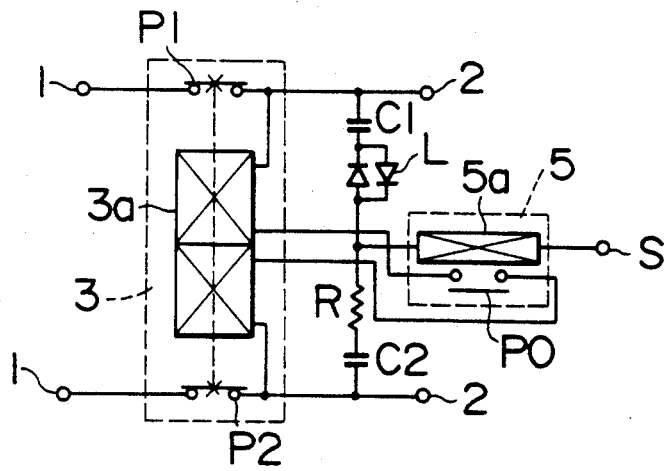

FIG. 2 is a circuit diagram of a preferred embodiment of a water sensing type power breaker circuit according to the present invention.

A first relay 3 is disposed between terminals 1, 1 on the side of an ac power supply and terminals 2, 2 on the side of a load. The first relay 3 cuts off two conductors 4, 4 connecting the power supply to the load by means of contacts $P_1$ and $P_2$. Both ends of coils of the first relay are connected to the conductors 4, 4 between the contacts $P_1$, $P_2$ and the load-side terminals 2, 2. The coils of the first relay are consisted of two coils 3a and 3b connected in series each other and a junction between both the coils 3a and 3b is cut off by a contact $P_o$ of a second relay 5. This contact is "off", that is, open in the normal state. When both the coils are connected through the contact $P_o$ of the second relay, a current flows through both the coils from the power supply and both the contacts $P_1$ and $P_2$ of the first relay are opened by exciting force of the coils 3a and 3b so that the load is cut off from the power supply. The contacts are maintained to be opened mechanically by a mechanism not shown and are returned to be closed by an external mechanical force.

A condenser circuit including a first condenser $C_1$, a light emitting diode L, a resistor R and a second condenser $C_2$ connected in series is connected in parallel with the load between the contacts $P_1$, $P_2$ of the first relay and the load.

When the contact of the first relay is closed, an ac current flows through the condenser circuit so that the light emitting diode L emits light. The state in which the light emitting diode emits light represents that both the contacts $P_1$ and $P_2$ are closed and the circuit is in the normal state.

One end of a coil 5a of a second relay is connected to an intermediate point of both the condensers $C_1$ and $C_2$ of the condenser circuit and the other end of the coil 5a is connected to a water sensing element S. When the water sensing element is brought into contact with water which is electrically connected to ground or when the water sensing element is electrically brought into contact with any one of the conductors 4 through water, a current flows through the coil 5a of the second relay. The contact $P_o$ of the second relay is closed by exciting force of the coil 5a produced by the current. Consequently, both the coils of the first relay are connected each other and a current flows through both the coils so that the contacts $P_1$ and $P_2$ of the first relay are opened to cut off the load from the power supply and stop the light emission of the light emitting diode L. Further, when a current flows through the coil 5a of the second relay, the coil 5a is necessarily connected in series to any one of the condensers $C_1$ and $C_2$ and water serving as a resistor and accordingly a kind of constant current circuit is formed to limit a leakage current.

Figure 3:
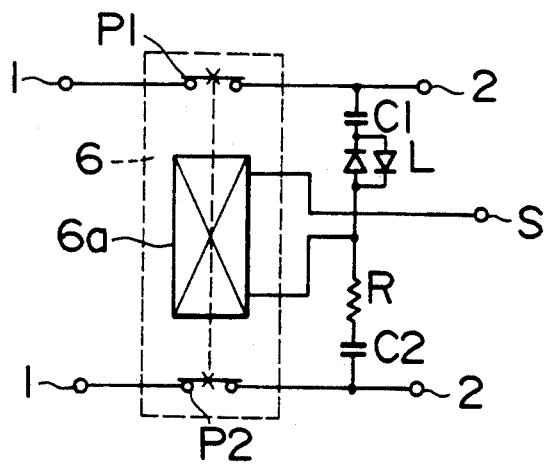

FIG. 3 shows a modification of a second circuit. A relay 6 is disposed between power-side terminals 1, 1 and load-side terminals 2, 2. Contacts $P_1$ and $P_2$ of the relay 6 cut off conductors 4, 4 connecting between the power-side terminals and the load-side terminals 2, 2. A condenser circuit including a first condenser $C_1$, a light emitting diode L, a resistor R and the second condenser $C_2$ is connected in parallel with the load between the contacts $P_1$, $P_2$ and the load-side terminals 2, 2. One end of a coil of a relay 6a is connected to an intermediate point of both the condensers $C_1$, $C_2$ of the condenser circuit and the other end of the coil of the relay 6a is connected to a water sensing element S.

When the water sensing element S is brought into contact with water which is electrically connected to ground or when the water sensing element is brought into any one of the conductors through water, a current flows through the coil 6a of the relay and the contacts $P_1$ and $P_2$ are opened by exciting force of the coil 6a produced by the current. Consequently, the load is cut off from the power supply and light emission of the light emitting diode L is stopped. Further, in order to achieve this circuit, it is necessary to use a relay having a sufficiently high sensitivity and including contacts maintained to be opened mechanically and returned to be closed by external mechanical force.

Figure 4:
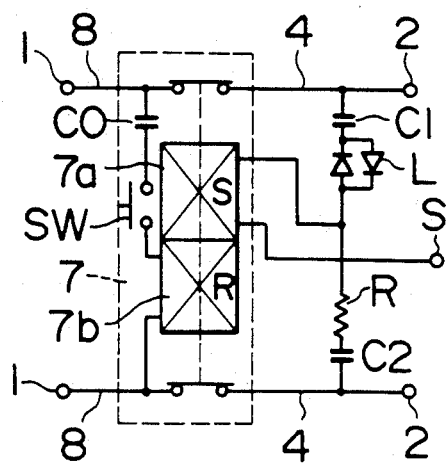

FIG. 4 is a circuit diagram of a water sensing type power breaker circuit which is a modification of the circuit of FIG. 3.

A relay used in this circuit is a relay named a set/reset type relay. This relay includes an operation coil 7a and a rest coil 7b connected in series and one end of the operation coil 7a is connected to an intermediate point of both the condensers $C_1$ and $C_2$ of the condenser circuit having the same circuit configuration as that of FIG. 3. A junction between both the coils is connected to a water sensing element S. On the other hand, one ned of the reset coil is connected to a conductor 8 connecting the contact $P_1$ and the power-side terminal 1 through a condenser $C_o$ and a reset switch SW, and the other end thereof is connected to a conductor 8 connecting the contact $P_2$ and the power-side terminal 1.

When the reset switch is once depressed, the contacts $P_1$ and $P_2$ are closed and this closed state is maintained mechanically. When the water sensing element S is brought into contact with water which is electrically connected to ground or when the water sensing element S is brought into contact with any one of conductors 4, 4 through water, a current flows through the operation coil to open both the contacts $P_1$ and $P_2$ so that the load is cut off from the power supply and light emission of the light emitting diode is stopped. Further, when the reset switch SW is depressed, the contacts $P_1$ and $P_2$ are returned to be closed.

Figure 5:
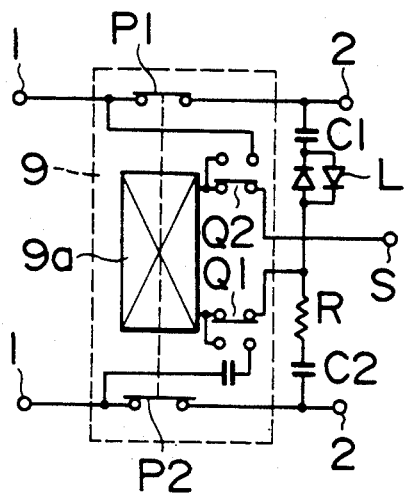

FIG. 5 is a circuit diagram of a water sensing type power breaker circuit which is a modification of the circuit of FIG. 3. This circuit can electrically maintain the state in which contacts are opened by themselves.

In the same manner as in FIG. 3, a condenser circuit is disposed in conductors 4, 4 connecting contacts $P_1$ and $P_2$ of a relay and the load in parallel with the load.

When the contacts $P_1$ and $P_2$ of the relay 9 are closed, the load and the power supply are connected each other and the light emitting diode L emits light. One end of a coil 9a of a relay 9 is connected through a contact $Q_1$ to an intermediate point of both the condensers $C_1$ and $C_2$ of the condenser circuit and the other end of the relay 9a is connected through a contact $Q_2$ to the water sensing element S. When the water sensing element S is brought into contact with water which is electrically connected to ground or when the water sensing element S is brought into contact with any one of conductors 4, 4 through water, a current flows through the coil 9a and the contacts $P_1$ and $P_2$ are opened to cut off the load from the power supply. At this time, the contacts $Q_1$ and $Q_2$ are switched and the coil is supplied with a current from the power supply. Accordingly, the state in which the contacts $P_1$ and $P_2$ are opened is maintained electrically by themselves.

Figure 6:
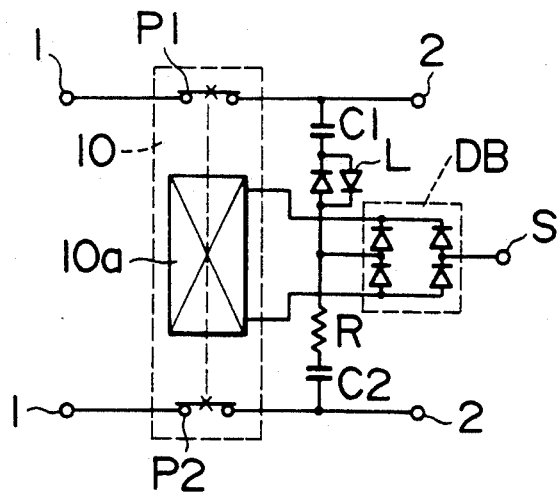

FIG. 6 shows an example in the case where a high-sensitive relay is operated in a dc voltage. Most of a high-sensitive relay 10 uses a magnet and accordingly a coil 10a thereof has a polarity. In such a case, a diode bridge DB as shown in the figure is employed to convert a current flowing through the coil into a dc current even if a leakage current is an ac current so that the present invention can be implemented.

Figure 7:
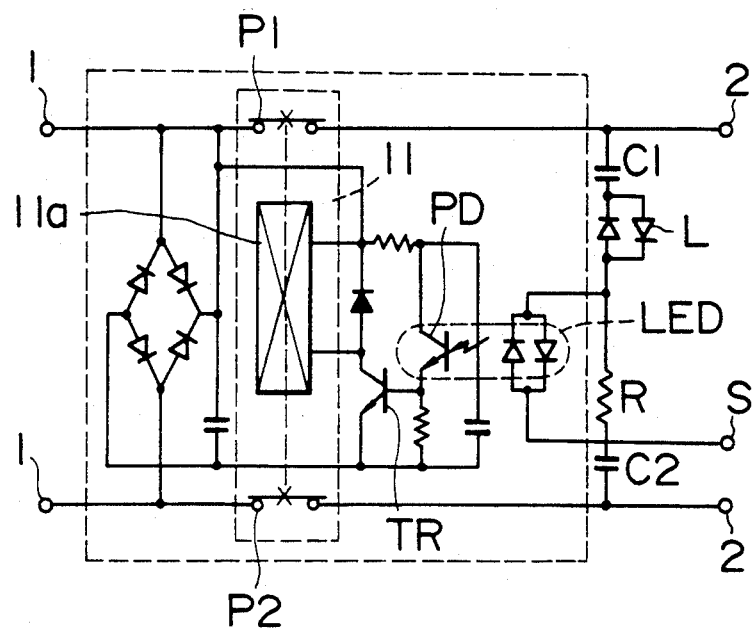

FIG. 7 shows an example using a photo-coupler. When a leakage current flows through the water sensing element S, a light emitting diode LED of the photo-coupler emits light which is detected by a photo-diode PD of the photo-coupler and is converted into an electrical signal. The electrical signal is amplified by an amplifier TR to drive the coil 11a of the relay 11.

Figure 10:
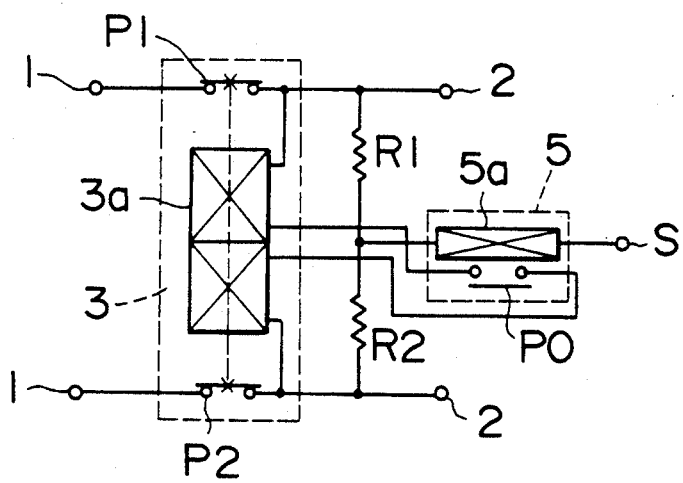
FIGS. 10 and 11 are circuit diagram of embodiments according to the present invention in the case where at least one of impedance elements is a resistor.
Figure 11:
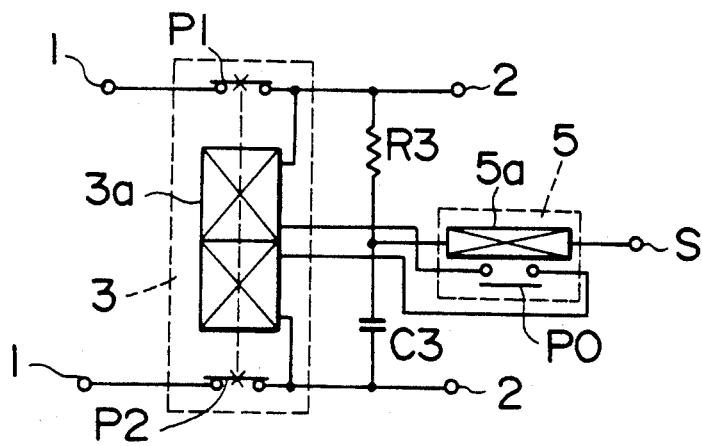

FIG. 10 shows an example of a circuit corresponding to that of FIG. 2 in the case where first and second impedance elements are resistors. FIG. 11 shows an example of a circuit corresponding to that of FIG. 2 in the case where the first impedance element is a resistor and the second impedance element is a condenser. Further, the circuit can be configured so that the first impedance element is a condenser and the second impedance element is a resistor. Both or one of the first and second condensers in the embodiments of FIGS. 1 to 7 can be replaced by resistors.

Figure 8:
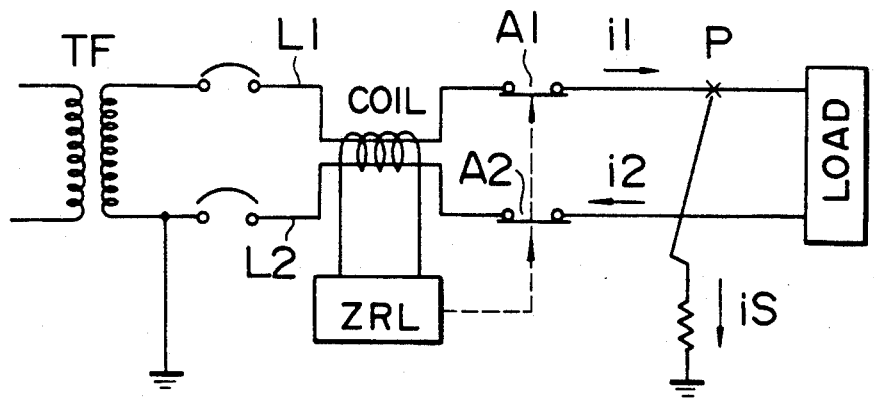
FIG. 8 is a circuit diagram of a conventional water sensing type power breaker.

When the water sensing type power breaker circuit is mounted in the electric appliance, it is required that the relay, the power-side terminal of the relay and the portion connected to the power supply (portion of the conductor 8 of FIG. 8) are made watertight by heat-shrinkable resin or the like so that the leakage current does not flow from the relay and the power-side terminals of the relay when the water sensing elements detects the flowing of a current and the relay is operated so that the first and second contacts are opened. It is preferred that the whole circuit is made watertight.

I claim:

1. A water sensing type power breaker circuit comprising first and second contacts having one polarity connected to a power supply and the other polarity connected to a load, an impedance element circuit including first and second impedance elements connected in series with each other and which is connected in parallel with the load, a water sensing element made of an electrical conductor connected to an intermediate point between both said impedance elements through a conductor, and a relay for detecting a current flowing through said conductor to open said first and second contacts when the current flows through the conductor, said relay being held by itself so that said first and second contacts are opened, said first impedance element being a resistor and said second impedance element being a condenser.

2. A water sensing type power breaker circuit according to claim 1, wherein said relay comprises a first relay including first and second contacts and a second relay including a coil for detecting that a current flows through said water sensing element and a coil of said first relay is cut off by an output contact of said second relay.

3. A water sensing type power breaker circuit according to claim 1, wherein said relay comprises a coil for detecting that a current flows through said water sensing element and a relay including first and second contacts.

4. A water sensing type power breaker circuit according to claim 1, wherein a coil of said relay includes a series circuit including an operation coil and reset coil, and when a current flows through said water sensing element and a current flows through said operation coil, said first and second contacts are opened and the state of opening both said contacts is maintained mechanically, while when a current flows through said reset coil, both said contacts are closed.

5. A water sensing type power breaker circuit according to claim 1, wherein when a leakage current flows trough a coil of the relay, the contacts of the relay are opened and both ends of the coil are connected to the power source to maintain a state in which the current flows through the coil.

6. A water sensing type power breaker circuit according to claim 1, wherein said relay is a dc type high-sensitive relay and an ac current flowing through the water sensing element is rectified by a diode bridge to be supplied to a coil of the relay.

7. A water sensing type power breaker circuit according to claim 1, wherein said relay, power-side terminals of said relay and a portion connected to the power supply are made watertight.

8. A water sensing type power breaker circuit comprising first and second contacts having one polarity connected to a power supply and the other polarity connected to a load, an impedance element circuit including first and second impedance elements connected in series with each other and which is connected in parallel with the load, a water sensing element made of an electrical conductor connected to an intermediate point between both said impedance elements through a conductor, and a relay for detecting a current flowing through said conductor to open said first and second contacts when the current flows through the conductor, said relay being held by itself so that said first and second contacts are opened, said relay comprising a relay including first and second contacts, a diode for emitting light when a current flows through said water sensing element, a photo-diode for converting a light signal of said light emitting diode into an electrical signal, and an amplifier for amplifying an output of said photo-diode, and output of said amplifier being supplied to a coil of the relay.

9. A water sensing type power breaker circuit according to claim 8, wherein said relay comprises a first relay including first and second contacts and a second relay including a coil for detecting that a current flows through said water sensing element and a coil of said first relay is cut off by an output contact of said second relay.

10. A water sensing type power breaker circuit comprising first and second contacts having one polarity connected to a power supply and the other polarity connected to a load, an impedance element circuit including first and second impedance elements connected in series with each other which is connected in parallel with the load, a water sensing element made of an electrical conductor connected to an intermediate point between both said impedance elements through a conductor, and a relay for detecting a current flowing through said conductor to open said first and second contacts when the current flows through the conductor, said relay being held by itself so that said first and second contacts are opened; said first and second impedance elements being constituted of resistors.

11. A water sensing type power breaker circuit according to claim 10, wherein said relay comprises a first relay including first and second contacts and a second relay including a coil for detecting that a current flows through said water sensing element and a coil of said first relay is cut off by an output contact of said second relay.

12. A water sensing type power breaker circuit comprising first and second contacts having one polarity connected to a power supply and the other polarity connected to a load, an impedance element circuit including first and second impedance elements connected in series with each other which is connected in parallel with a load, a water sensing element made of an electrical conductor connected to an intermediate point between both said impedance elements through a conductor, and a relay for detecting a current flowing through said conductor to open said first and second contacts when the current flows through the conductor, said relay being held by itself so that said first and second contacts are opened; said first impedance element is constituted of a condenser and said second impedance element is constituted of a resistor.

13. A water sensing type power breaker circuit comprising first and second contacts having one polarity connected to a power supply and the other polarity connected to a load, an impedance element circuit including first and second impedance elements connected in series with each other and which is connected in parallel with the load, a water sensing element made of an electrical conductor connected to an intermediate point between both said impedance elements through a conductor, and a relay for detecting a current flowing through said conductor to open said first and second contacts when the current flows through the conductor, said relay being held by itself so that said first and second contacts are opened, said first and second impedance elements being constituted of condensers.

14. A water sensing type power breaker circuit according to claim 13, wherein said relay comprises a first relay including first and second contacts and a second relay including a coil for detecting that a current flows through said water sensing element and a coil of said first relay is cut off by an output contact of said second relay.

* * * * *